United States Patent
Ehrlich et al.

(10) Patent No.: US 8,018,669 B2
(45) Date of Patent: Sep. 13, 2011

(54) PROXIMITY DETECTION METHOD FOR MAGNETIC HEAD AND RECORDING MEDIUM

(75) Inventors: Richard M. Ehrlich, Saratoga, CA (US); Craig L. Tomita, Pleasanton, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

(21) Appl. No.: 12/504,430

(22) Filed: Jul. 16, 2009

(65) Prior Publication Data

US 2011/0013305 A1    Jan. 20, 2011

(51) Int. Cl.
*G11B 27/36* (2006.01)
*G11B 21/02* (2006.01)
(52) U.S. Cl. ............................. 360/31; 360/75
(58) Field of Classification Search .................. None
See application file for complete search history.

(56) References Cited

U.S. PATENT DOCUMENTS

| 6,930,844 | B2 | 8/2005 | Yeh et al. |
| 7,158,325 | B1* | 1/2007 | Hu et al. ..................... 360/69 |
| 7,180,692 | B1 | 2/2007 | Che et al. |
| 7,215,495 | B1 | 5/2007 | Che et al. |
| 7,224,548 | B1* | 5/2007 | Emo ..................... 360/78.04 |
| 7,359,139 | B1 | 4/2008 | Wu et al. |
| 2008/0218898 | A1* | 9/2008 | Yamashita et al. ......... 360/78.04 |

* cited by examiner

*Primary Examiner* — Andrew L Sniezek
(74) *Attorney, Agent, or Firm* — Patterson & Sheridan, LLP

(57) ABSTRACT

Touchdown between a read/write head of disk drive and a recording medium is detected based on the variance in the frequency domain of position error signals (PES), each of which is measured after incrementally positioning the read/write head closer to the recording medium, from a baseline PES. The synchronous portion of the baseline PES is quantified and removed from the baseline PES and subsequent PES measurements to remove the effect of the synchronous portion of the baseline PES. The non-synchronous portion of the PES measured at a particular read/write head position may also be removed by synchronously averaging multiple PES measurements for each read/write head position. Detection of touchdown may be based on the rate of change of the variance in the frequency domain of PES relative to a baseline PES, instead of the absolute value of the variance.

3 Claims, 10 Drawing Sheets

PRIOR ART

PROXIMITY DETECTION METHOD FOR MAGNETIC HEAD AND RECORDING MEDIUM

BACKGROUND OF THE INVENTION

1. Field of the Invention

Embodiments of the present invention relate generally to magnetic disk drives and, more particularly, to a proximity detection method for a magnetic head and a recording medium.

2. Description of the Related Art

In a hard disk drive (HDD), the spacing between a magnetic recording head and magnetic storage disk, referred to as "head clearance," is a critical performance parameter. Reducing head clearance during reading and writing operations can reduce bit error rate and allow accurate storage and retrieval of data that are stored on a disk at very high linear densities. Dynamic fly-height (DFH) control of read/write (R/W) heads is commonly used by modern HDDs to allow low enough fly heights for high-density storage media while maintaining sufficient head clearance over different head locations and disk drive temperatures.

For proper operation of an HDD, DFH control schemes generally require some form of calibration to determine how the fly height of an R/W head varies with stroke location, temperature, and applied DFH control signal. An important step in calibrating DFH control is determination of touchdown, i.e., when the R/W head actually makes contact with the storage medium. During normal operation such contact is avoided, but as part of calibration, touchdown provides an absolute benchmark of R/W head position relative to a disk, and is used in subsequent calibration procedures. For calibration at a given stroke location and temperature, the DFH control signal is stepped through increasing values until a portion of the R/W head begins to contact the disk. Given the touchdown control level and the actuation efficiency, i.e., the amount of fly-height change per unit of applied control signal, a DFH control algorithm can regulate the fly height accurately for an R/W head as a function of location and temperature.

A touchdown-detection algorithm is commonly used to control the HDD during HDD self-test when determining touchdown. Ideally, such a touchdown-detection algorithm can be performed by an HDD without the need for external measurement equipment. When no external equipment is needed for touchdown determination—other than the mechanical support and power supply already required for HDD self-test—the HDD test process is significantly expedited. This is because the setup and breakdown of each HDD before and after self-test can remain unchanged, thereby avoiding complications to the self-test process. In addition, a touchdown-detection algorithm should reliably determine touchdown. Declaring a touchdown power that is too low results in the R/W head flying higher than the optimal height, which can result in poor read/write quality. Declaring a touchdown power that is too high results in the R/W head flying lower than the optimal height, which can result in undesired head/disk contact and failure in the field. Further, a touchdown-detection algorithm should not require excessive head/disk contact during the measurement process for robust calibration of the R/W head position, to minimize the potential for damage to the R/W head and disk surface.

There are a number of methods known in the art for determining touchdown. One approach is to observe the gain of the read channel variable gain amplifier (VGA) as DFH power is increased, and declare touchdown when further increases in DFH power do not produce significant decreases in VGA gain. However, to detect the point at which VGA gain decreases, the DFH power must be driven past the point of initial head/disk contact, which is undesirable. Another approach involves observing acoustic output of the HDD by placing a microphone near the R/W head and declaring touchdown when a pre-determined level of acoustic output is detected. Because installation and removal of the microphone can significantly complicate setup of an HDD for the self-test process, this method is also undesirable. Another approach involves observing overall servo track misregistration (TMR) of the R/W head as DFH power is increased and declaring touchdown when the TMR exceeds a specified level. As with the VGA gain approach, accurate determination of touchdown may require overdriving the R/W head past the point of initial contact with the disk. Therefore, this approach is also undesirable for determining touchdown. In another approach, modulation of the read signal is observed from the R/W head, and touchdown is declared when a specified level of modulation is reached. Overdriving of the R/W head past initial contact with the disk may be necessary for this approach as well. In yet another approach, variance of position error signal (PES), either for total PES or specified frequency bands, is observed as a function of DFH power, and touchdown is declared when the observed variance exceeds a threshold value. While such an approach can detect touchdown for some disk drives, it has been demonstrated that for many disk drives, and even for particular tracks on a given disk drive, touchdown may not be reliably detected by this method.

In light of the above, there is a need for an improved method of touchdown detection that can be performed by an HDD during the self-test process without additional measurement equipment and does not require excessive head/disk contact.

SUMMARY OF THE INVENTION

One or more embodiments of the invention provide methods for detecting touchdown between a magnetic head and a recording medium by evaluating position error signals (PES) in the frequency domain while incrementally increasing the dynamic fly-height (DFH) control signal.

In a first embodiment, touchdown is detected based on variances in the PES at each of a discrete number of frequencies that are within one or more selected frequency bands in the frequency domain, i.e., the PES variance is "band-limited," and the variance is measured with respect to a baseline PES. The one or more frequency bands are selected so that portions of the PES spectrum that either do not change at touchdown or change for reasons unrelated to touchdown are ignored. In addition, the synchronous portion of the baseline PES is quantified and removed from the baseline PES measurement and all subsequent PES measurements. This has the effect of better isolating the portion of the PES that is affected by touchdown.

A method for detecting touchdown between a magnetic head and a recording medium, according to the first embodiment, comprises measuring a baseline position error signal of the magnetic head with the magnetic head at a baseline position, determining a synchronous portion of the baseline position error signal, generating an adjusted baseline position error signal by removing the synchronous portion of the baseline position error signal from the baseline position error signal, measuring additional position error signals of the magnetic head with the magnetic head positioned successively closer to the recording medium with each additional measurement, generating adjusted position error signals by removing the synchronous portion of the baseline position error signal from each of the additional position error signals, converting the adjusted baseline position error signal and each of the adjusted position error signals from a time domain into a frequency domain, and detecting touchdown based on a combined variance value that is computed from variances in the adjusted position error signals with respect to the adjusted baseline position error signal at each of a discrete number of frequencies that are within one or more selected frequency bands in the frequency domain.

In a second embodiment, touchdown is detected based on variances in the band-limited PES, where the effect of the synchronous portion of the baseline PES and the non-synchronous portion of each PES measured at a particular DFH power are removed. The non-synchronous portion of the PES measured at a particular DFH power is removed by synchronously averaging multiple PES measurements for each DFH power. Again, this has the effect of better isolating the portion of the PES that is affected by touchdown.

A method for detecting touchdown between a magnetic head and a recording medium, according to the second embodiment, comprises measuring a baseline position error signal of the magnetic head with the magnetic head at a baseline position, determining a synchronous portion of the baseline position error signal, generating an adjusted baseline position error signal by removing the synchronous portion of the baseline position error signal from the baseline position error signal, measuring additional position error signals of the magnetic head with the magnetic head positioned successively closer to the recording medium with each additional measurement, generating an adjusted position error signal for each of the additional position error signals by removing the synchronous portion of the baseline position error signal from a synchronous portion of the additional position error signal, converting the adjusted baseline position error signal and each of the adjusted position error signals from a time domain into a frequency domain, and detecting touchdown based on a combined variance value that is computed from variances in the adjusted position error signals with respect to the adjusted baseline position error signal at each of a discrete number of frequencies that are within one or more selected frequency bands in the frequency domain.

In a third embodiment, touchdown is detected based on the rate of change, i.e., the slope, of band-limited PES variation after 1) removal of the synchronous portion of the baseline PES or 2) removal of both the synchronous portion of the baseline PES and the non-synchronous portion of each PES measured at a particular DFH power.

A method for detecting touchdown between a magnetic head and a recording medium, according to the third embodiment, comprises driving the magnetic head to multiple positions that are successively closer to the recording medium until touchdown is detected, determining a position error signal for each of the multiple positions, converting each of the position error signals from a time domain into a frequency domain, computing a combined variance value from variances in the position error signals with respect to a baseline position error signal at each of a discrete number of frequencies that are within one or more selected frequency bands in the frequency domain, and detecting touchdown when the difference between the average combined variance value for a group of positions of the magnetic head that are closest to the recording medium and a baseline average exceeds a threshold value. The determined position error signal at each of the positions may be equal to a measured position error signal minus a synchronous portion of a baseline position error signal, or may be derived from a synchronous portion of a measured position error signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

The present invention contemplate methods for detecting touchdown between an R/W head and disk by determining the variance in the frequency domain of position error signals (PES), each measured after incrementally increasing the DFH control signal, from a baseline PES. To quantify the variance in the frequency domain, a discrete Fourier transform (DFT) of the baseline PES and of each PES produced for a given DFH control signal is used. In addition, band-limited PES variance may be used to improve sensitivity to touchdown, in which the variance is only measured for a selected portion of the DFT spectrum.

Embodiments of the invention include a "baseline repeatable runout (RRO) removal" method, in which the synchronous portion of the baseline PES is quantified and removed from the baseline PES measurement and all subsequent PES measurements, a "band-limited RRO method," in which the non-synchronous portion of the PES measured at a particular DFH power is removed by synchronously averaging multiple PES measurements for each DFH power, and a "slope" method, in which the rate of change of the output of either the baseline RRO removal or band-limited RRO method is observed. The baseline RRO removal method is described below in conjunction with FIG. 4, the band-limited RRO method is described below in conjunction with FIG. 7, and the slope method is described below in conjunction with FIG. 11.

Figure 1:
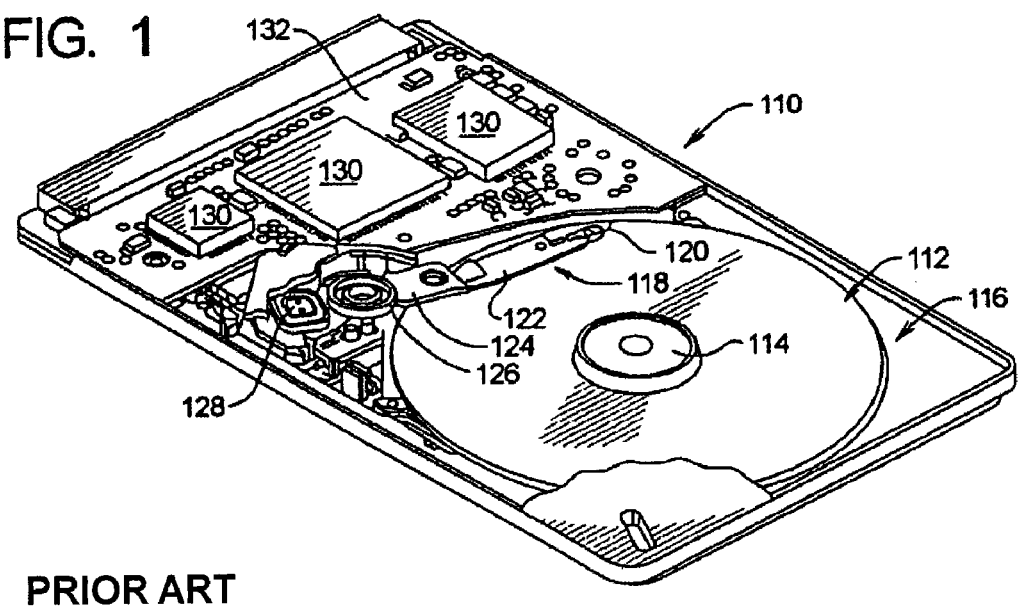
FIG. 1 is a perspective view of a disk drive that can benefit from embodiments of the invention described herein.

FIG. 1 is a perspective view of a disk drive 110 that can benefit from embodiments of the invention as described herein. For clarity, disk drive 110 is illustrated without a top cover. Disk drive 110 includes a magnetic storage disk 112 that is rotated by a spindle motor 114. Spindle motor 114 is mounted on a base plate 116. An actuator arm assembly 118 is also mounted on base plate 116, and includes an R/W head 120 mounted on a flexure arm 122. Flexure arm 122 is attached to an actuator arm 124 that rotates about a bearing assembly 126. Voice coil motor 128 moves R/W head 120 relative to magnetic storage disk 112, thereby positioning RAN head 120 over the desired concentric data storage track disposed on the surface 112A of magnetic storage disk 112. Spindle motor 114, R/W head 120, and voice coil motor 128 are coupled to electronic circuits 130, which are mounted on a printed circuit board 132. Electronic circuits 130 include a read channel, a microprocessor-based controller, and random access memory (RAM). For clarity of description, disk drive 110 is illustrated with a single magnetic storage disk 112 and actuator arm assembly 118; however, disk drive 110 may also include multiple disks 112 and multiple actuator arm assemblies 118.

Figure 2:
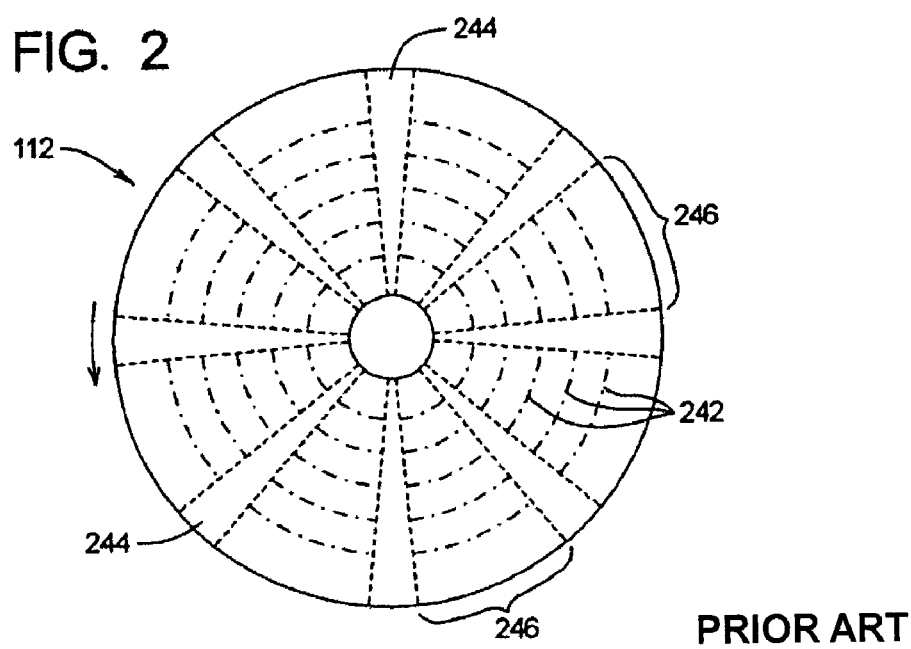
FIG. 2 illustrates a magnetic storage disk.

FIG. 2 illustrates magnetic storage disk 112 with data organized in a typical manner well known in the art. Magnetic storage disk 112 includes concentric data storage tracks 242 for storing data. Each of concentric data storage tracks 242 is schematically illustrated as a centerline, however each of concentric data storage tracks 242 occupies a finite width about a corresponding centerline. Magnetic storage disk 112 includes radially aligned servo spokes 244, also referred to as servo wedges, that cross concentric data storage tracks 242 and store servo information in servo sectors in concentric data storage tracks 242. The servo information is read by R/W head 120 during read and write operations to position the head 120 above a desired track 242. For clarity, a small number of concentric data storage tracks 242 and servo spokes 244 are shown. Typically, the actual number of concentric data storage tracks 242 and servo spokes 244 included on magnetic storage disk 112 is considerably larger.

Figure 3:
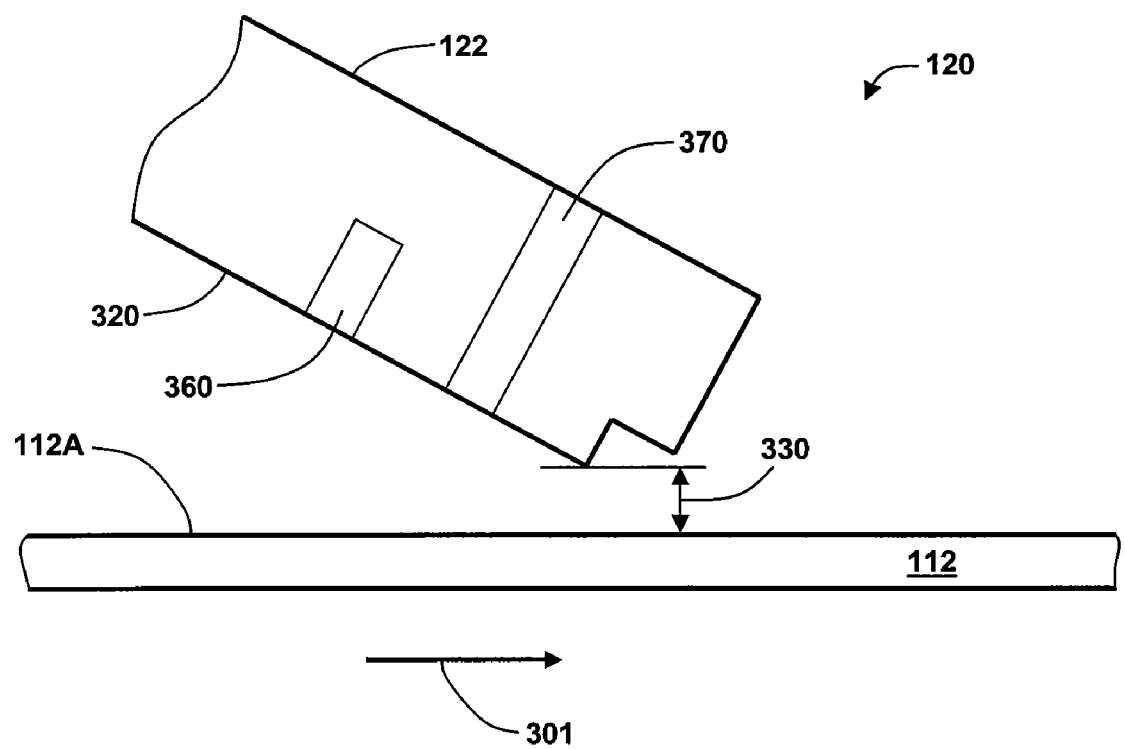
FIG. 3 is a schematic side view of an R/W head positioned over a surface of magnetic storage disk.

FIG. 3 is a schematic side view of R/W head 120 positioned over surface 112A of magnetic storage disk 112. R/W head 120 includes a read head 360, a write head 370, and an air-bearing surface (ABS) 320, which faces toward surface 112A of magnetic storage disk 112. The rotation of magnetic storage disk 112 in the direction of arrow 301 generates an air bearing between ABS 320 of R/W head 120. During operation of disk drive 110, the air bearing counterbalances the slight spring force produced by the suspension of flexure arm 122, thereby holding R/W head 120 a small, substantially constant fly height 330 above surface 112A. With the high linear densities now in use for data storage on modern disk drives, fly height 330 is commonly less than 10 nanometers and may be as small as 3 nanometers.

In operation, a thermal or mechanical fly-height actuator (not shown) disposed on flexure arm 122 varies the vertical position of R/W head 120 over surface 112A as necessary to maintain an optimal fly height 330. A fly-height controller contained in electronic circuits 130 controls the fly-height actuator. The fly-height controller steps R/W head 120 incrementally closer to or farther from surface 112A by increasing or decreasing the DFH control signal applied to the fly-height actuator, where the DFH control signal can be expressed in digital-to-analog converter (DAC) counts. The DFH control signal causes thermal dissipation in the slider. The resulting shape distortion of the slider can bring the read and write elements closer to the disk surface. For example, when the applied DFH control signal is at a minimum, i.e., zero DAC counts, fly height 330 is at its maximum value. The object of a touchdown determination algorithm is to quantify the number of DAC counts applied to the fly-height actuator that result in actual or imminent contact between RAN head 120 and surface 112A.

Precise alignment of R/W head 120 over a desired concentric data storage track 242 is monitored by means of the PES. As is commonly known in the art, a PES is produced by servo bursts located in servo spokes 244 when magnetic storage disk 112 is rotated in proximity to R/W head 120. The PES allows the microprocessor-based controller in electronic circuits 130 to determine the position of R/W head 120 relative to a given concentric data storage track 242. As noted above, embodiments of the invention contemplate declaring touchdown of R/W head 120 by any of three different methods, referred to herein as the baseline RRO removal method, the band-limited RRO method, and the slope method. Each of these methods include observation of variances in a band-limited PES spectrum, as opposed to the total PES spectrum, and are described in turn below.

Because the methods disclosed herein observe variances in band-limited PES, only a limited portion of the PES spectrum is used to determine touchdown. Hence, the remaining portions of the PES spectrum, which either do not change at touchdown or change for other reasons unrelated to touchdown, are ignored by the algorithm. Consequently, sensitivity of the touchdown detection algorithm is substantially improved. Inventor analysis has determined that the changes in the PES spectrum that occur at touchdown are found in the higher frequency region of the spectrum, e.g., between about one half the Nyquist frequency and the Nyquist frequency of the PES. Observation has shown that variance in the lower frequency portions of the PES spectrum, particularly in the frequency range of 0-2000 Hz, is dominated by other noise sources not associated with touchdown, including spindle motor vibration (500-800 Hz), test stand vibration (10s-100s of Hz), and disk-flapping modes and arm assembly modes (1-2 kHz). In addition, the low frequency "beating," i.e., the low-frequency modulation of higher-frequency vibrations (generally in the 10s of Hz), produced by any such resonant vibration sources that are mechanically coupled and closely matched in frequency can generate another source of low frequency variance in PES, such as the 15 Hz beating generated by a 1215 Hz arm assembly vibration mode and a 1230 Hz disk "umbrella" vibration mode.

Such lower frequency variance in the PES can be eliminated by selecting a lower bound to the band-limited PES variation algorithm, thereby improving the signal-to-noise ratio of the touchdown algorithm. For example, in one embodiment a disk drive having approximately 150 servo wedges and rotating at 120 Hz undergoes touchdown calibration. The PES frequency distribution used by the baseline RRO removal, the band-limited RRO, or the slope methods for such a disk drive may include the frequency range of approximately 5000 Hz to 9000 Hz, the latter of which being the Nyquist frequency of the disk drive. One of skill in the art will appreciate that the frequency range of a PES frequency distribution used for touchdown detection in embodiments of the invention will vary as a function of the Nyquist frequency of the PES, which can differ according to the design and operation of a given disk drive.

The baseline RRO removal method for determining touchdown is now described. Inventor analysis has determined that much if not all of the additional servo track misregistration (TMR) of the R/W head suffered at touchdown is synchronous with disk revolution. Hence, any synchronous runout, or RRO, present in the baseline PES measurement can make detection of touchdown problematic when the baseline RRO includes frequency components that coincide with the frequencies that are excited at touchdown. For example, the baseline RRO can mask touchdown-induced TMR by acting as noise present at the frequencies of interest for determining touchdown. Worse, when baseline RRO includes frequency components that coincide with the frequencies excited at touchdown, but are out of phase with the touchdown-induced TMR, the PES generated by the touchdown-induced TMR is cancelled. Consequently, TMR does not increase at touchdown, thereby making touchdown detection by observing PES variance with respect to total baseline PES problematic. In the baseline RRO removal method, the synchronous portion of the baseline PES, i.e., the baseline RRO, is quantified and removed from the baseline PES measurement and the PES measurements for each DFH power, so that touchdown-induced TMR is essentially unaffected by the synchronous portion of the baseline PES, i.e., baseline RRO.

Figure 4:
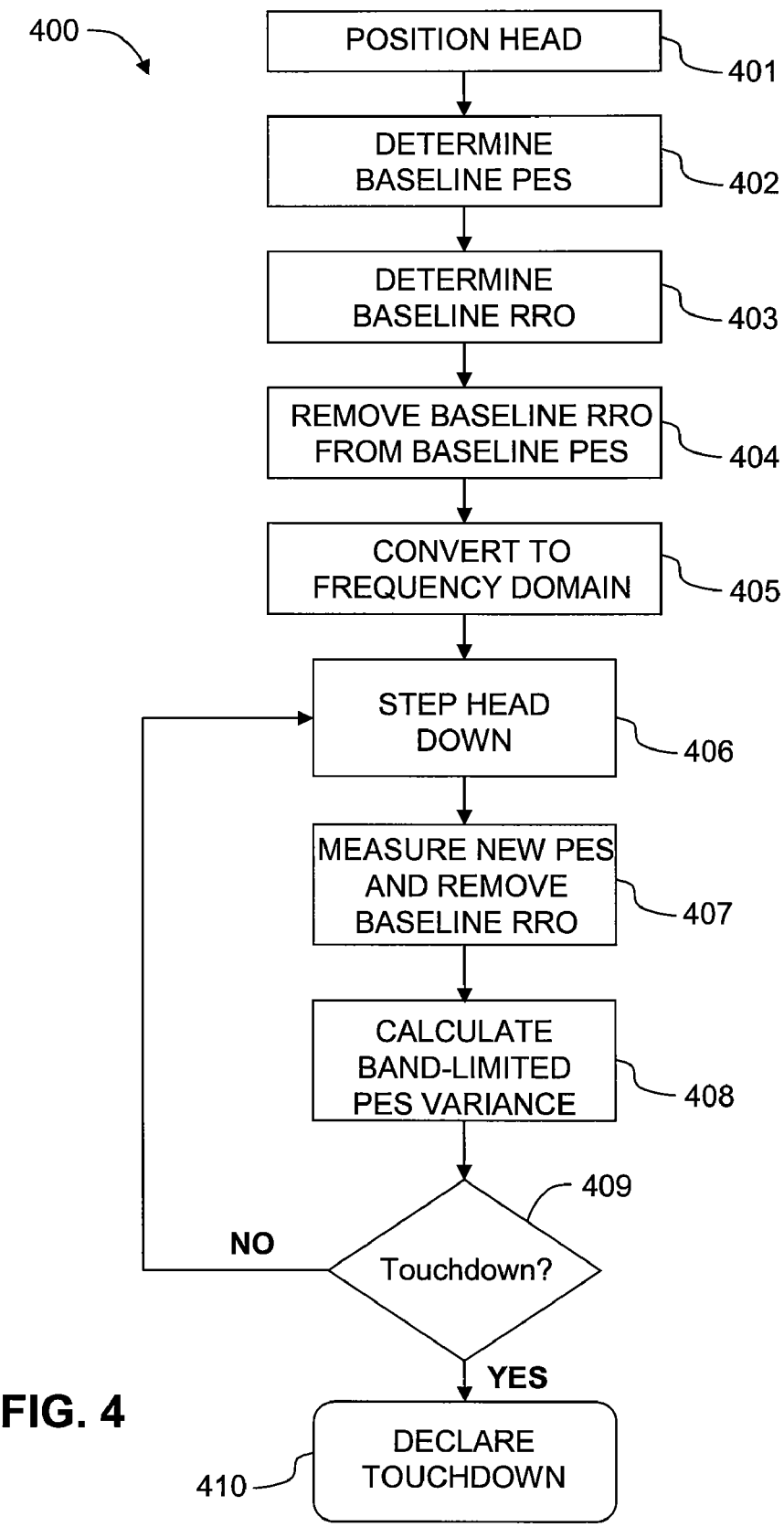
FIG. 4 sets forth a flow diagram illustrating a baseline RRO removal method for determining touchdown of an R/W head against a magnetic storage disk, according to an embodiment of the invention.

FIG. 4 sets forth a flow diagram illustrating a baseline RRO removal method 400 for determining touchdown of an R/W head against a magnetic storage disk, according to an embodiment of the invention. For ease of description, baseline RRO removal method 400 is described in terms of a disk drive substantially similar to disk drive 110 in FIG. 1. However, other types of disk drives may also benefit from the use of method 400. The commands for carrying out steps 401-409 may reside in the disk drive control algorithm and/or as values stored in the electronic circuits of the disk drive or on the storage disk itself.

In step 401, the R/W head, such as R/W head 120 in FIG. 1, is positioned at a maximum distance from a magnetic storage disk. For disk drive 110, this is accomplished by reducing the DFH power to zero, i.e., 0 DAC counts.

In step 402, disk drive 110 determines baseline PES by measuring PES over one or more revolutions for one location on magnetic storage disk 112.

In step 403, disk drive 110 determines baseline RRO, i.e., the synchronous portion of baseline PES, by synchronously averaging the PES for multiple revolutions of storage disk 112. The same measurements used to determine baseline PES in step 402 may also be used for step 403. Alternatively, additional runs may be performed to collect the requisite PES data for step 403.

In step 404, disk drive 110 removes the baseline RRO determined in step 403 from the baseline PES determined in step 402 by subtracting the baseline RRO values from the baseline PES, thereby producing an adjusted baseline PES.

In step 405, the adjusted baseline PES is converted into the frequency domain by DFT methods commonly known in the art to generate a baseline PES frequency distribution.

In steps 402-405 described above, the PES for multiple runs of magnetic storage disk 112 is measured while R/W head 120 is positioned away from surface 112A of magnetic storage disk 112, and the measured PES, after removal of the synchronous component, is converted to the frequency domain by DFT or other known methods. Thus, all PES measurements are taken with the DFH control signal at zero DAC counts. In another embodiment, PES is measured and averaged over multiple runs, where each run is performed with R/W head 120 positioned at a slightly different height above surface 112A. For example, 10 runs may be used with DFH power at 0 DAC counts for the first run, 1 DAC counts for the second run, 2 DAC counts for the third run, and so on. Alternatively, a baseline PES frequency distribution may based on the average of multiple runs, where one or more of the runs with the greatest band-limited PES variances and one or more of the smallest band-limited PES variances are thrown out before averaging. Other suitable methods of establishing a baseline PES frequency distribution may be readily devised by one of skill in the art upon reading the disclosure herein.

In step 406, the R/W head is stepped down one or more DAC counts toward the surface of the disk. For maximum resolution of touchdown, the R/W head is stepped down a single DAC count. Because in some situations performing a PES measurement at each DAC count may be overly time-consuming, the R/W head may instead be stepped down two or more DAC counts in step 406.

In step 407, the PES is measured at the new position of the R/W head and the baseline RRO determined in step 403 is subtracted from the measured PES, and the resultant PES is converted to the frequency domain by DFT methods commonly known in the art.

In step 408, the PES variance at the current DAC count is calculated by comparing the resultant PES frequency distribution determined in step 407 with the baseline PES frequency distribution determined in step 405. Only a limited portion of the PES frequency distribution, e.g., 5000 Hz to 9000 Hz, is used to calculate the PES variance.

A number of numerical methods may be used to determine the PES variance in step 408. In one embodiment, the variance may be a sum or the mean of the difference in PES magnitude (between the resultant PES frequency distribution determined in step 407 with the baseline PES frequency distribution determined in step 405) at each frequency, squared. Alternatively, the total magnitude of the resultant PES frequency distribution can be compared to the magnitude of the baseline PES frequency distribution. Other methods of calculating the variance can be readily devised by one of ordinary skill in the art. However, summing the mean of the difference in PES magnitude squared to quantify PES variance advantageously increases the sensitivity of the touchdown detection algorithm by including both amplitude increases and decreases of the resultant PES frequency distribution relative to the baseline PES frequency distribution. This is because some frequencies may decrease below the baseline value due to damping and other effects at initial touchdown. Thus, in some situations, the total PES energy may not increase significantly when touchdown first occurs, and a variance calculation based on the increase of the total PES energy may delay declaration of touchdown. Equation 1 provides one example of quantifying the variance of a measured PES spectrum at a given DFH power, i.e., DAC count, from a baseline PES spectrum:

$$\operatorname{Var}(PES)_{DAC} \equiv \frac{1}{n}\sum_{j=1}^{n}(PES_j - PES_{BASELINES,j})^2 \qquad \text{Equation 1}$$

where n=the number of discrete frequencies measured in the PES spectra; PESJ=the magnitude of PES for each discrete frequency, j; and $PES_{BASELINE,j}$ is the magnitude of the baseline-PES at discrete frequency, j.

In step 409, touchdown determination is performed, i.e., the PES variance calculated in step 408 is compared to the touchdown criterion. In one embodiment, touchdown is declared when the PES variance calculated in step 408 exceeds a specified quantity or threshold value. In another embodiment, touchdown is declared when the variance of the measured PES spectrum exceeds a specified threshold value by a specified multiplicative factor, e.g., 1.5, 2.0, etc. If touchdown has not occurred, the process returns to step 406. In yet another embodiment, touchdown is declared only after the touchdown criterion is met for multiple consecutive DFH powers, e.g., after the third consecutive DFH power. One of skill in the art, upon reading the disclosure herein, can devise a suitable selection criterion for declaring touchdown power based on the design of a given disk drive and the process control requirements for manufacturing the disk drive. In one embodiment, one or more confirmation runs may also be performed once touchdown is declared, in which the PES at the declared touchdown power is re-measured. If touchdown has occurred, the process continues to step 410. In step 410, touchdown is declared.

Method 400, as described above, would require storage of all of the revolutions of measured PES, in order to allow subtraction of the synchronous portion of the baseline PES before converting into the frequency-domain. In alternative embodiments, it is possible to store smaller amounts of data by keeping: (1) a running total of the PES at each servo-wedge during the measurement for determination of the synchronous portion of the PES; (2) the most recent revolution of actual PES with which the band-limited PES variance for that revolution can be computed after conversion into the frequency domain; and (3) a running sum of the band-limited PES variance. The band-limited PES variance with the synchronous portion of the baseline PES removed can be estimated as the mean band-limited PES variance minus the band-limited RRO variance, where the mean band-limited PES variance is determined by dividing the running sum of band-limited PES variances by the number of revolutions of PES measured, and the band-limited RRO variance is determined by transforming the synchronous portion of the PES into the frequency domain and summing the squares of the selected frequency components. This estimate can be made because the expected value of the square of the sum (or difference) of two independent random variables is equal to the sum (or difference) of the expected values of the individual squares. In other words, the expected value of (Total_PES−Synchronous_PES)^2 is estimated to be equal to the expected value of Total_PES^2 minus the expected value of Synchronous_PES^2.

Figure 5A:
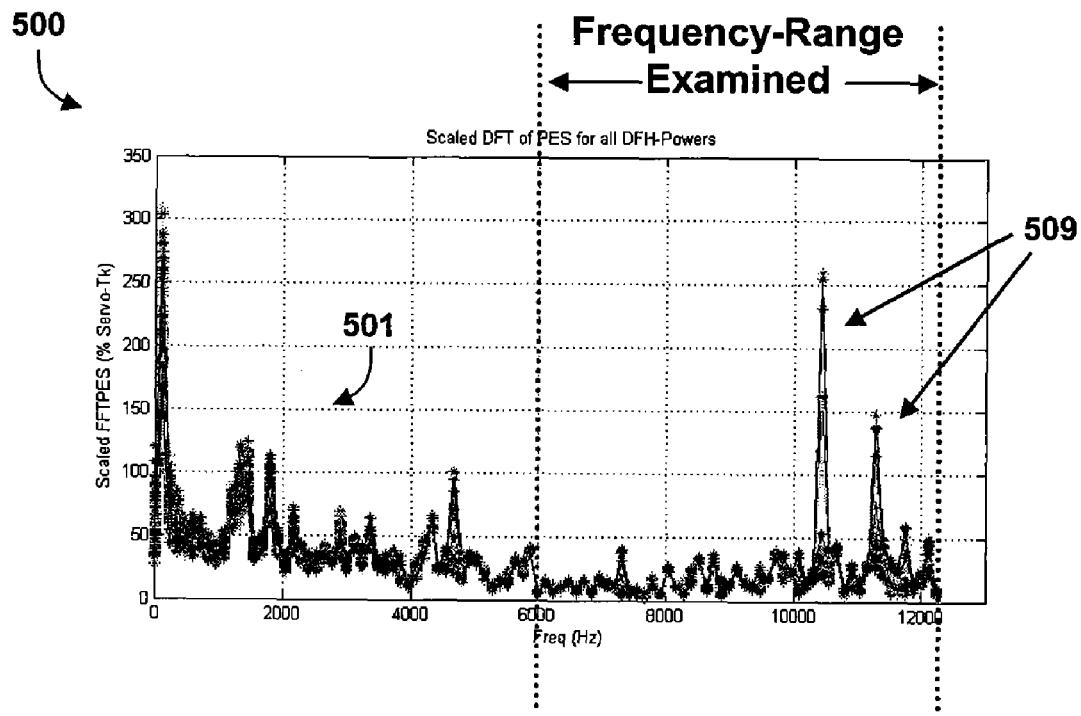
FIG. 5A is a graph of a series of PES frequency distributions.

FIG. 5A is a graph 500 of a series of PES frequency distributions 501. Each of PES frequency distributions 501 is a DFT of a PES produced during track following by R/W head 120, where each PES frequency distribution 501 is taken at a different DFH power. The horizontal axis of graph 500 represents the frequency of the PES and has a range of 0 Hz to approximately 12,000 Hz, and the vertical axis of graph 500 represents the scaled magnitude of PES spectral components.

In the example illustrated in FIG. 5A, PES frequency distributions 501 end at approximately 12,000 Hz, which is the Nyquist frequency of the disk drive being calibrated. The frequency range examined is the range of frequencies from 6000 Hz to the Nyquist frequency. The frequency and spectral magnitude for all the spectra suffered by the drive for all the different DFH powers are superimposed on each other in graph 500 to illustrate where the spectra are the same and where they change at touchdown. The high frequency spikes 509 occur at the highest DFH powers, indicating touchdown. Touchdown in more clearly indicated in FIG. 5B.

Figure 5B:
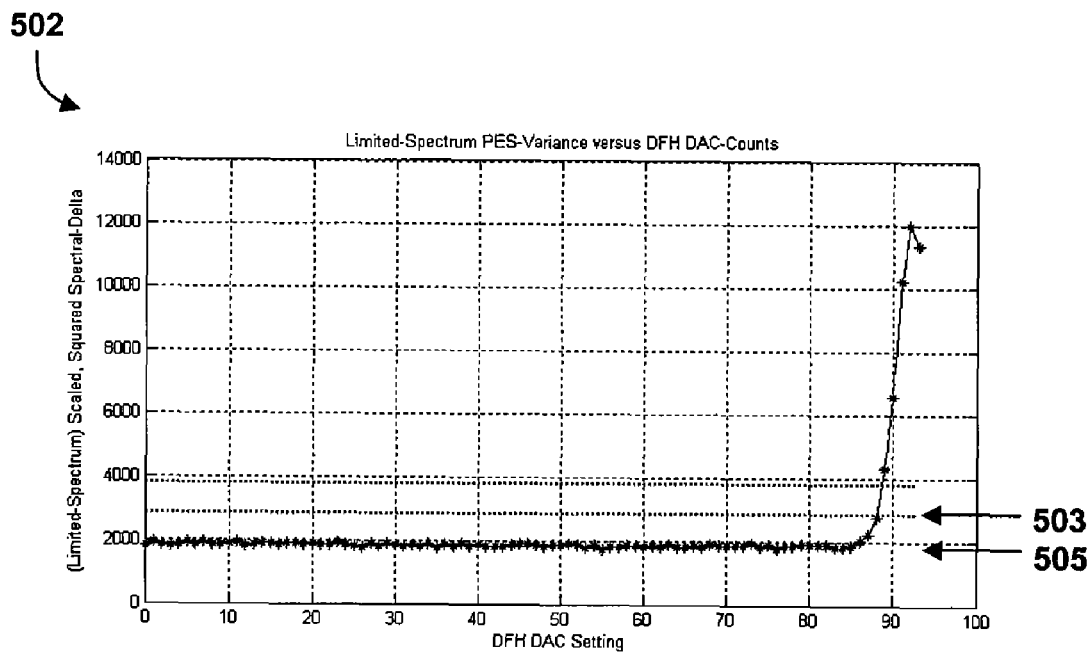
FIG. 5B sets forth a graph of band-limited PES variance from a baseline PES measured against DFH power for the spectra in FIG. 5A.

FIG. 5B sets forth a graph 502 of band-limited PES variance from a PES baseline measured against DFH power, in DAC counts, where the PES variance at each DAC count is measured over a limited portion of the frequency range and is calculated by the sum of the squares of each frequency component. In the example illustrated in FIG. 5B, the frequency range used to calculate variance for each DAC count is the band between 6 kHz and the Nyquist frequency of the PES, i.e., approximately 12,000 kHz. As shown, PES variance for DAC counts up to about 85 is approximately the same, and the onset of touchdown is clearly indicated at 90 DAC counts, when baseline PES variance exceeds the threshold 503 of approximately 3000 units.

Figure 6A:
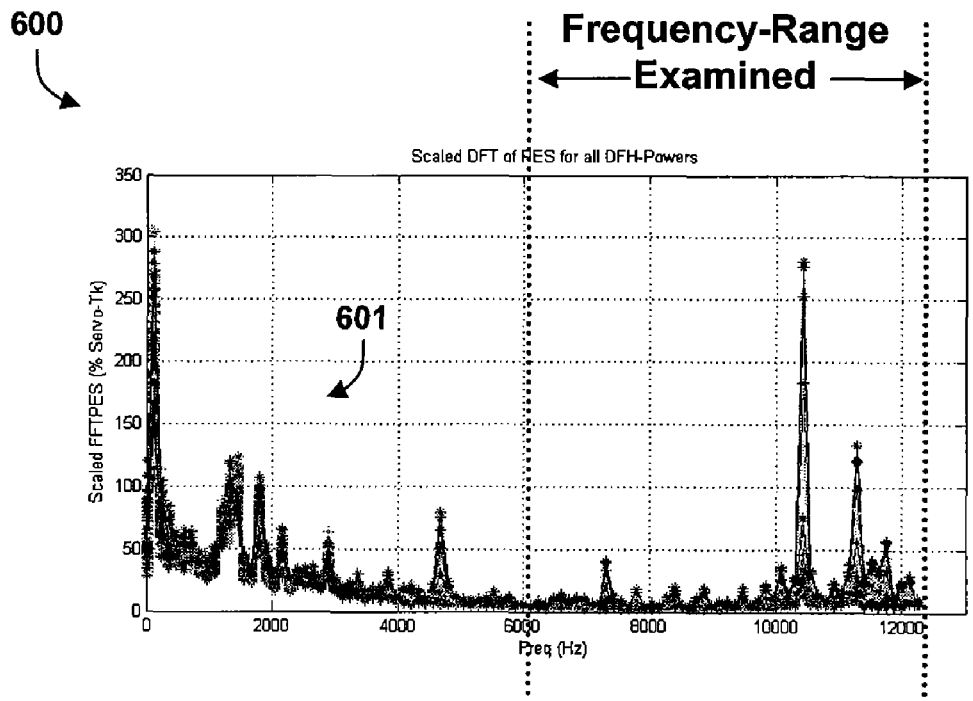
FIG. 6A is a graph of a series of PES frequency distributions that are obtained using the baseline RRO removal method.
Figure 6B:
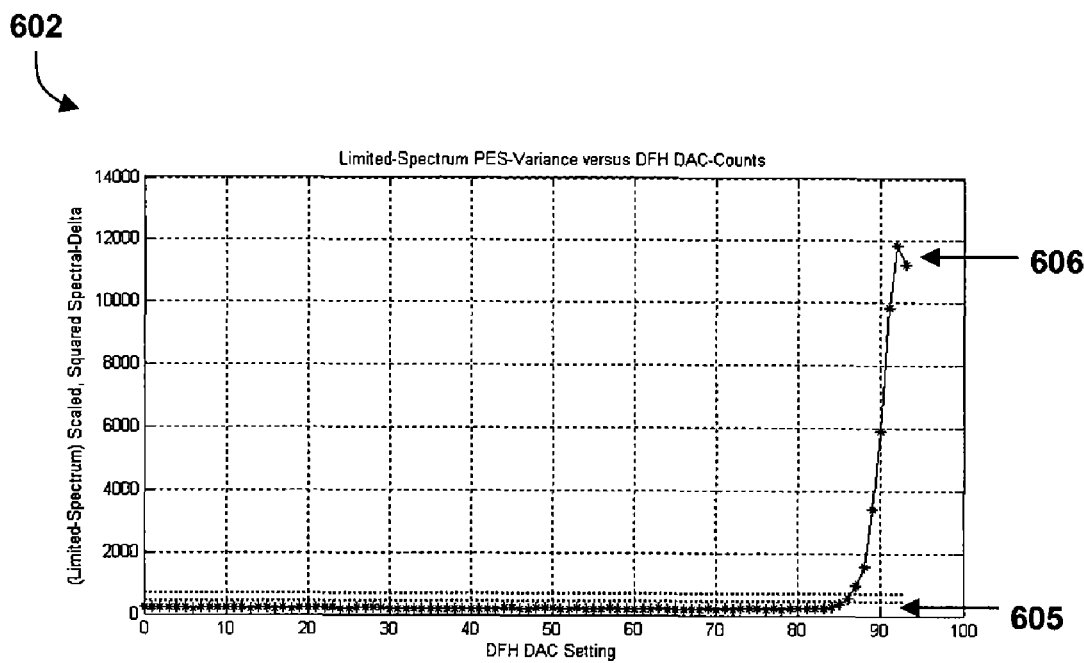
FIG. 6B sets forth a graph of band-limited PES variance from a baseline PES having the baseline RRO removed, measured against DFH power for the spectra in FIG. 6A.

FIGS. 6A and 6B, when compared to FIGS. 5A and 5B, respectively, illustrate the effectiveness of the baseline RRO removal method 400 for determining touchdown of an R/W head. FIG. 6A is a graph 600 of a series of PES frequency distributions 601, where the PES frequency distributions 601 are produced by processing the PES frequency distributions 501 from graph 500 using the baseline RRO removal method 400. Namely, the disk drive determines the baseline synchronous RRO and subtracts the baseline synchronous RRO from all PES measurements. Thus, the baseline RRO has been removed from each of the spectra in graph 600, which provides a more consistent result, and touchdown is more clearly indicated. These improvements are illustrated in FIG. 6B.

FIG. 6B sets forth a graph 602 of band-limited PES variance from a baseline PES having the baseline RRO removed, measured against DFH power for the spectra in graph 600. Because the bulk of the sum of the squares of the baseline spectrum is due to synchronous runout, when the baseline RRO has been removed by the baseline RRO removal method 400, the baseline 605 is substantially lower in graph 602 than the baseline 505 in graph 502. Thus, the signal-to-noise ratio of the calibration algorithm is substantially improved over the algorithm used to generate graph 502. In addition, because peak 606 in graph 602 is not substantially lower than the corresponding peak in graph 502, it can be inferred that at least some of the baseline RRO was actually canceling the touchdown-induced TMR that produced the spectra in graph 500. In contrast, if no cancellation had taken place, then peak 606 would be reduced by approximately as much as baseline 605 is reduced compared to baseline 505. One of skill in the art will appreciate that for "noisier" drives, i.e., drives having a less clearly defined baseline PES variance prior to touchdown, the removal of TMR-canceling baseline RRO can make the difference between accurate detection of touchdown and overdriving the R/W head past the point of initial contact with the disk.

The band-limited RRO method for determining touchdown is now described. Inventor analysis has determined that in some drives, a significant quantity of non-synchronous runout (NRRO) may be present in the frequencies of interest when trying to determine touchdown. Thus, the relatively high amplitude NRRO, which cannot be removed by baseline RRO removal method 400, can act as noise in the frequencies at which touchdown-induced TMR occurs, thereby masking the onset of touchdown. The band-limited RRO method, as described herein, effectively removes the majority of NRRO that can obscure the onset of touchdown.

Figure 7:
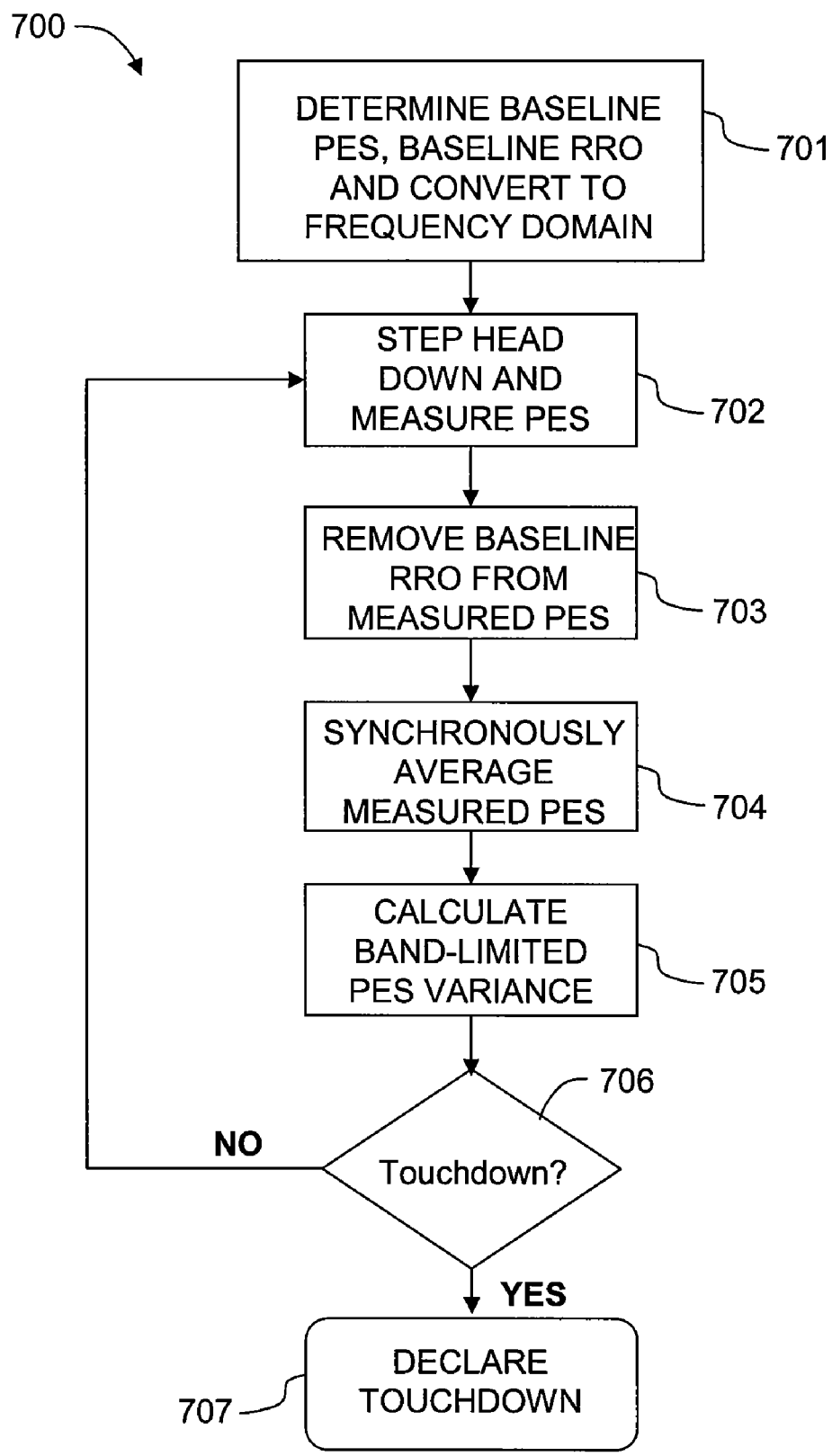
FIG. 7 sets forth a flow diagram illustrating a band-limited RRO method for determining touchdown of an R/W head against a magnetic storage disk, according to an embodiment of the invention.

FIG. 7 sets forth a flow diagram illustrating a band-limited RRO method 700 for determining touchdown of an R/W head against a magnetic storage disk, according to an embodiment of the invention. For ease of description, band-limited RRO method 700 is described in terms of a disk drive substantially similar to disk drive 110 in FIG. 1, however other disk drives may also benefit from the use of method 700. The commands for carrying out steps 701-707 may reside in the disk drive control algorithm and/or as values stored in the electronic circuits of the disk drive or on the storage disk itself.

In step 701, steps 401-405 of method 400 are performed to determine the baseline RRO, the adjusted baseline PES, and the baseline PES frequency distribution.

In step 702, the R/W head is stepped down one or more DAC counts toward the surface of the disk and a PES is measured for a plurality of revolutions, e.g., 10, 20, etc. Measuring PES for a larger number of revolutions will more completely remove the effect of NRRO on the PES variance. In one embodiment, a larger number of revolutions may be measured for a particular R/W head and/or location of touchdown measurement that is known to be subject a significant amount of NRRO, such as for an R/W head located between tow storage disks and/or at the outer diameter of the disks. In addition, for maximum resolution of touchdown, the R/W head is stepped down a single DAC count. Because in some situations performing a PES measurement at each DAC count may be overly time-consuming, the R/W head may instead be stepped down two or more DAC counts in step 702.

In step 703, the baseline RRO determined in step 701 is subtracted from each PES measurement taken in step 702, in order to remove the effect of synchronous runout present in the baseline PES.

In step 704, each of the PES measurements modified in step 703 is then synchronously averaged over a number of revolutions of storage disk 112, and the resultant PES is converted into the frequency domain by DFT methods commonly known in the art.

In step 705, the PES variance at the current DAC count is calculated by comparing the resultant PES frequency distribution determined in step 704 with the baseline PES frequency distribution determined in step 701. Different methods may be used to determine the PES variance in step 705, and are set forth above in step 408 of baseline RRO removal method 400.

In step 706, touchdown determination is performed, i.e., the PES variance calculated in step 705 is compared to the touchdown criterion. Different methods may be used to determine the PES variance in step 705, and are set forth above in step 409 of baseline RRO removal method 400. If touchdown has not occurred, the process returns to step 702. If touchdown has occurred, the process continues to step 707. In step 707, touchdown is declared.

Figure 8A:
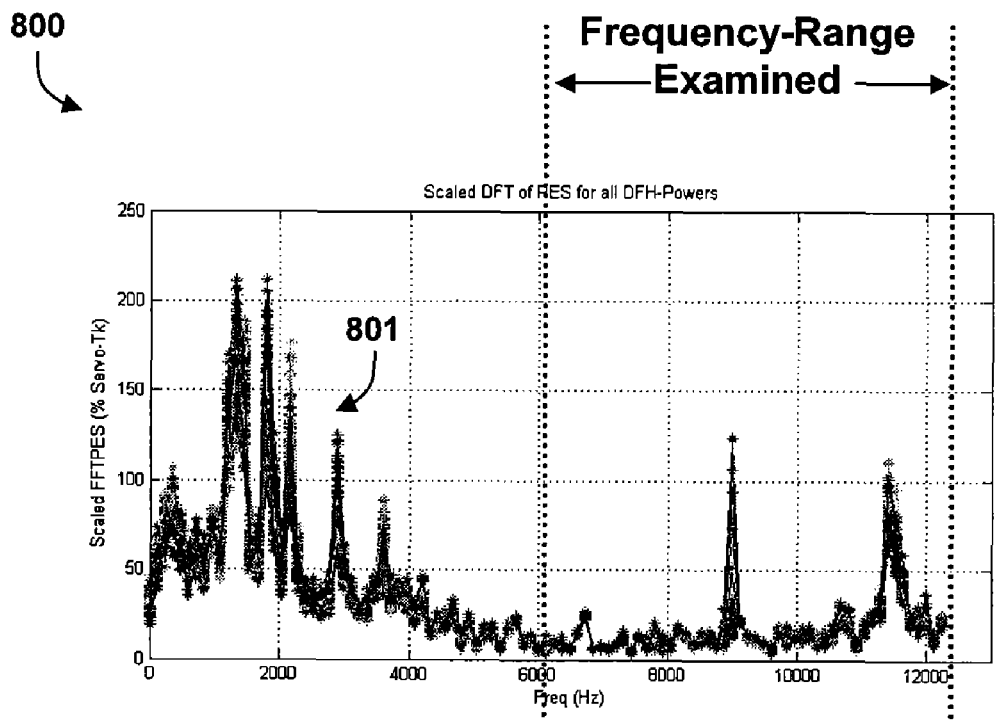
FIGS. 8A and 8B illustrate PES frequency distributions, and a graph of band-limited PES variance measured against DFH power, respectively.
Figure 8B:
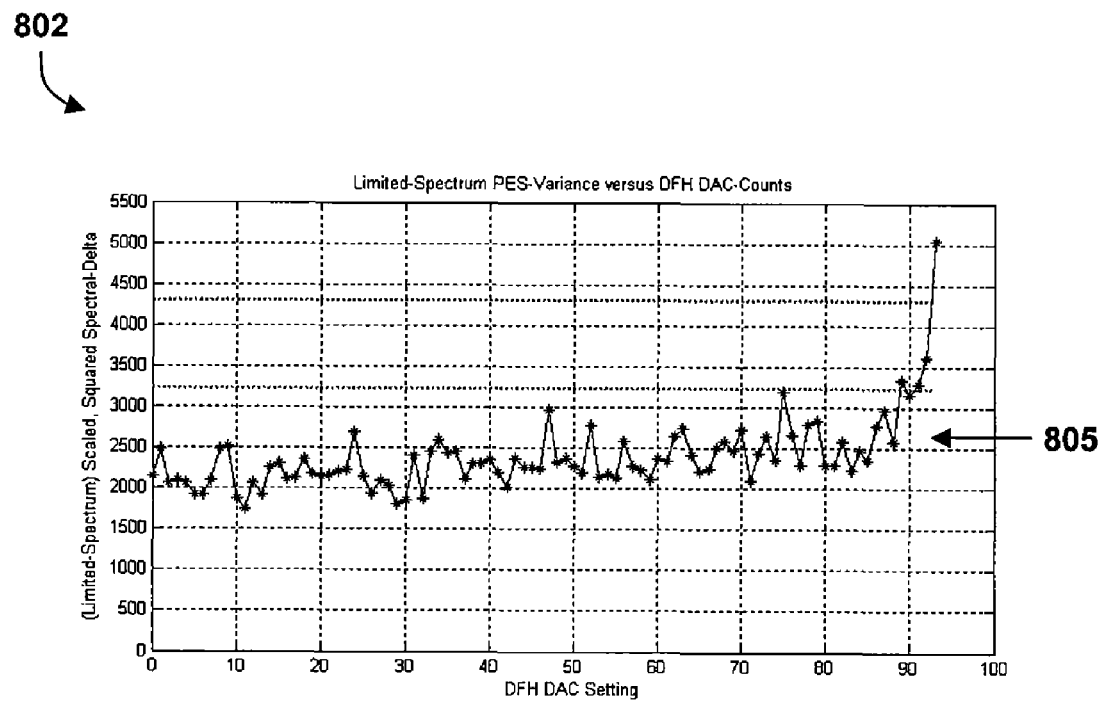
Figures 9A, 9B:
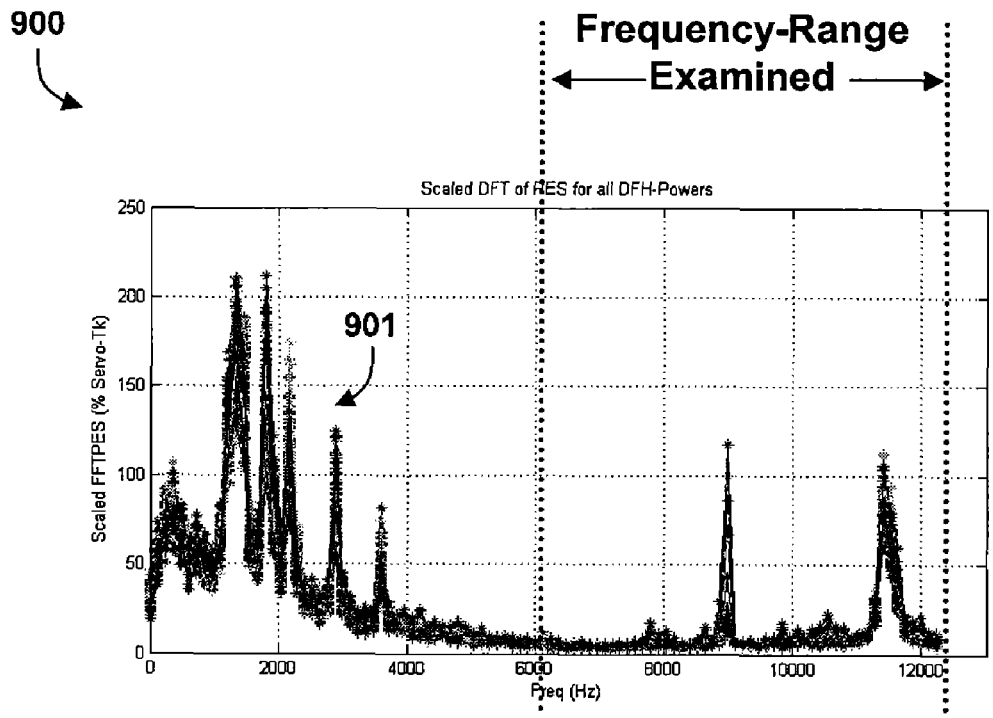
FIGS. 9A and 9B illustrate PES frequency distributions obtained using the baseline RRO removal method, and a graph of band-limited PES variance measured against DFH power, respectively.
Figure 10A:
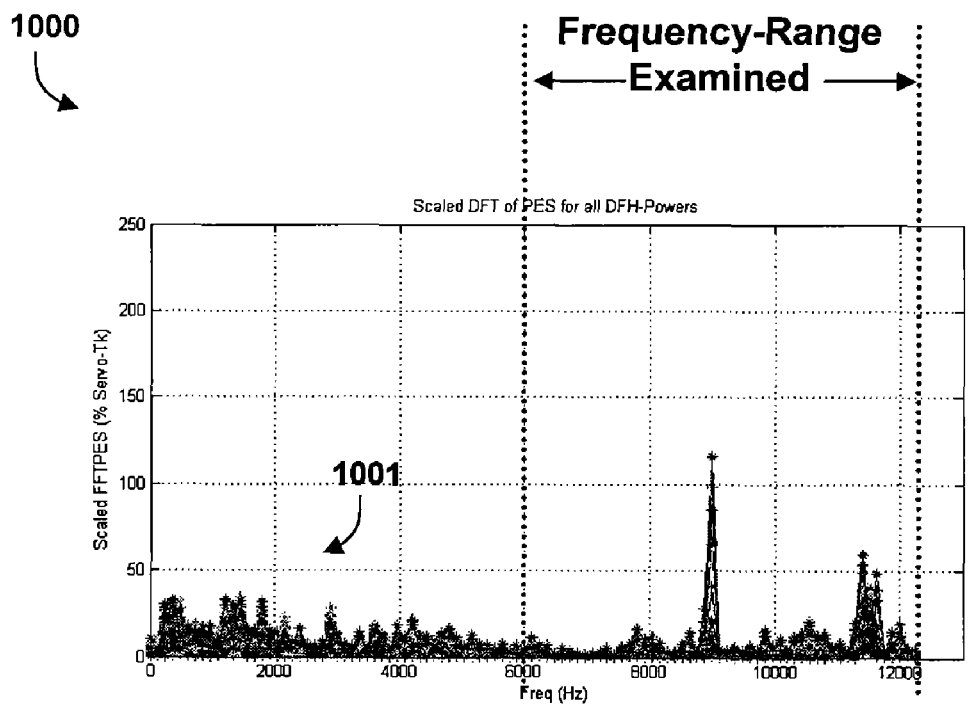
FIGS. 10A and 10B illustrate PES frequency distributions using the band-limited RRO method, and a graph of band-limited PES variance measured against DFH power, respectively.
Figure 10B:
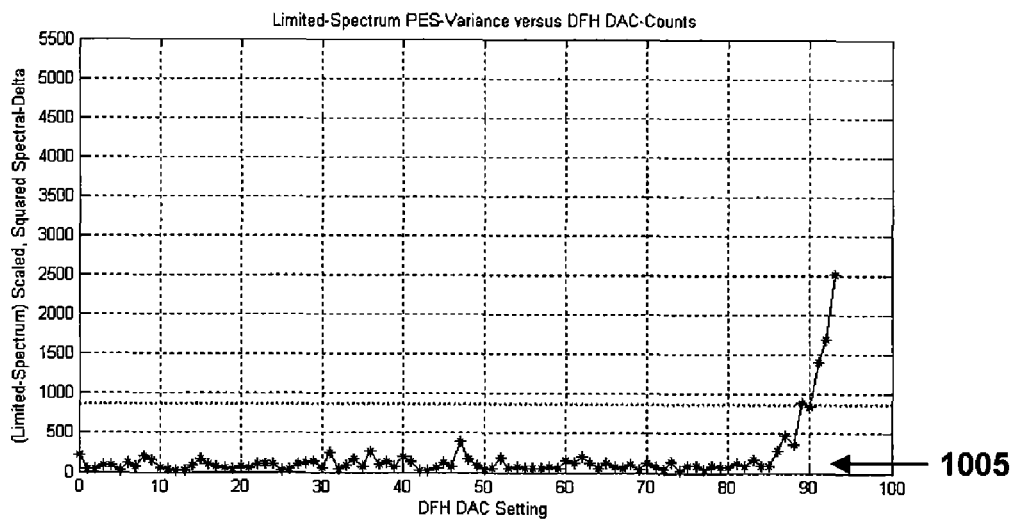

FIGS. 8A and 8B illustrate a graph 800 of PES frequency distributions 801 and a graph 802 of band-limited PES variance measured against DFH power, respectively, for a drive that experiences a significant amount of high-frequency NRRO during the calibration process. As shown, PES frequency distributions 801 produce a relatively high and "jittery" baseline 805, making a reliable touchdown determination problematic. FIGS. 9A and 9B illustrate a graph 900 of PES frequency distributions 901 and a graph 902 of band-limited PES variance measured against DFH power, respectively, for the same drive, where the PES frequency distributions 901 are produced by processing the PES frequency distributions 801 of FIG. 8A using the baseline RRO removal method 400. Due to the relatively large NRRO experienced by the drive, baseline RRO removal method 400 only improves baseline 805 incrementally to baseline 905. FIGS. 10A and 10B illustrate a graph 1000 of PES frequency distributions 1001 and a graph 1002 of band-limited PES variance measured against DFH power, respectively, for the same drive, where the PES frequency distributions 1001 are produced by processing the PES frequency distributions 801 of FIG. 8A using band-limited RRO method 700. In this case, the synchronous averaging of band-limited RRO method 700 does an excellent job of reducing the effects of NRRO, as evidenced by the low and constant baseline 1005 in graph 1002. Baseline 1005 facilitates reliable touchdown determination.

The slope method for determining touchdown is now described. The slope method examines the difference between the average of a PES variance metric at the beginning of touchdown determination and the average of the PES variance metric at the most recently measured DFH powers. Touchdown is declared when the difference between these two averages exceeds a threshold value, rather than by using a fixed threshold value for the PES metric itself. In one embodiment, the PES variance as determined in step 408 of baseline RRO removal method 400 is used as the PES variance metric. In another embodiment, the PES variance as determined in step 705 of band-limited RRO method 700 is used as the PES variance metric.

Figure 11:
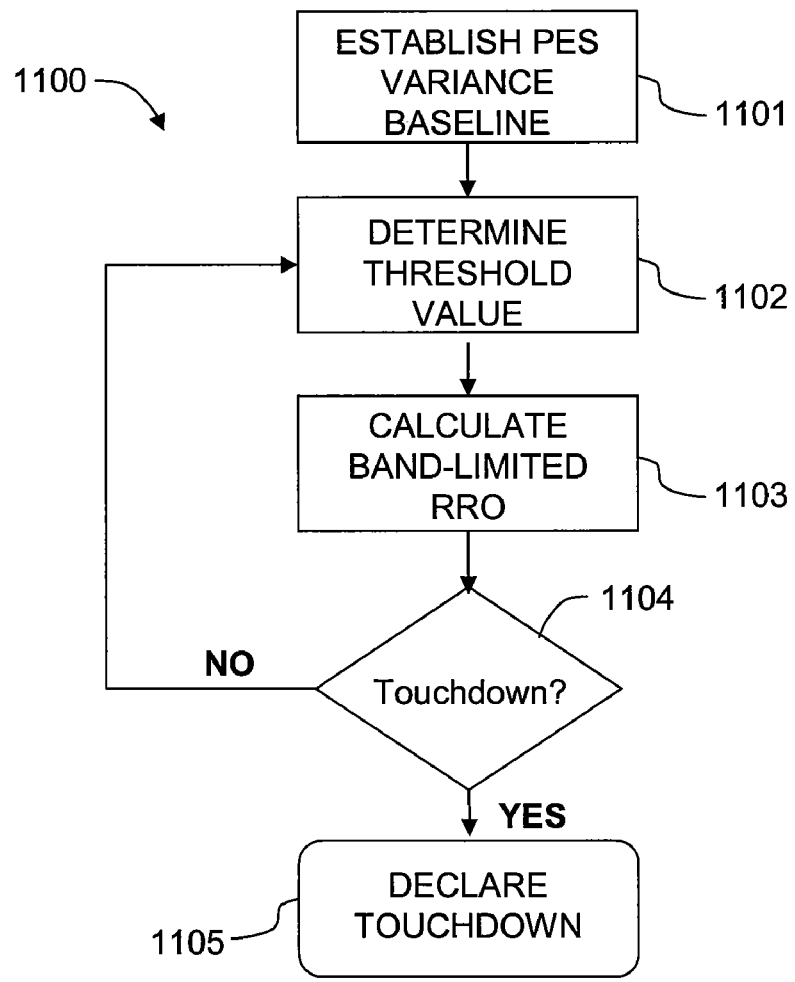
FIG. 11 sets forth a flow diagram illustrating a slope method for determining touchdown of an R/W head against a magnetic storage disk, according to an embodiment of the invention.

FIG. 11 sets forth a flow diagram illustrating a slope method 1100 for determining touchdown of an R/W head against a magnetic storage disk, according to an embodiment of the invention. For ease of description, slope method 1100 is described in terms of a disk drive substantially similar to disk drive 110 in FIG. 1, however other disk drives may also benefit from the use of method 700. The commands for carrying out steps 1101-1105 may reside in the disk drive control algorithm and/or as values stored in the electronic circuits of the disk drive or on the storage disk itself. It is noted that no additional measurements are necessary to perform slope method 1100.

In step 1101, a baseline for the selected PES variance metric is established by calculating the average value of the metric for a specified number of measurements at the beginning of the touchdown calibration, e.g., the first 10 or 20 DAC counts. In one embodiment, the baseline for PES variance is a running average of all PES variance values excluding the most recent values, which are averaged in step 1103, below. In such an embodiment, the baseline PES variance is updated with each DFH power. The metric used for slope method 1100 may be the PES variance for a given DFH power as measured by either baseline RRO removal method 400 or by band-limited RRO method 700.

In step 1102, a threshold value for declaring touchdown is determined. Touchdown is declared (in step 1105) when the average value of the most recent PES variance measurements exceeds the average baseline value for the PES variance by the threshold value. In one embodiment, the threshold value is a function of the history of the metric used and can change with each DFH power at which PES variance is measured.

In step 1103, the values of the most recent PES variance measurements are averaged. In one embodiment, the 10 most recent PES variance measurements are used. It is contemplated that the number of PES variance measurements averaged in step 1103 may be greater or less than 10. In another embodiment, the number of PES variance measurements averaged in step 1103 is two or more. However, averaging too few measurements may result in early touchdown declaration due to a few noisy samples, and averaging too many measurements may result in late touchdown declaration.

In step 1104, touchdown determination is performed, i.e., the average PES variance of the most recent PES variance measurements, e.g., the latest 10 DAC counts, is compared to the average baseline PES variance. Touchdown occurs when the difference exceeds the threshold value selected in step 1102. If touchdown has not occurred, the R/W head is stepped down with the next DFH power and the process returns to step 1101. If touchdown has occurred, the process continues to step 1105. In step 1105, touchdown is declared.

In one embodiment, touchdown cannot be declared below a specified number of DAC counts, for example 60 DAC counts. The minimum DAC count specified may be varied as a function of what model of drive or R/W head location is undergoing the touchdown calibration.

In one embodiment, the threshold determined in step 1102 may be increased with each DFH power so that the threshold remains a specified factor above the running baseline value. For example, if the difference calculated in step 1104 does not exceed but is greater than half the threshold, the threshold may be increased to twice the difference determined in step 1104. In one embodiment, there may be a maximum number of DAC counts specified, after which the threshold will not be increased regardless of the value of the difference calculated in step 1104.

Figure 12:
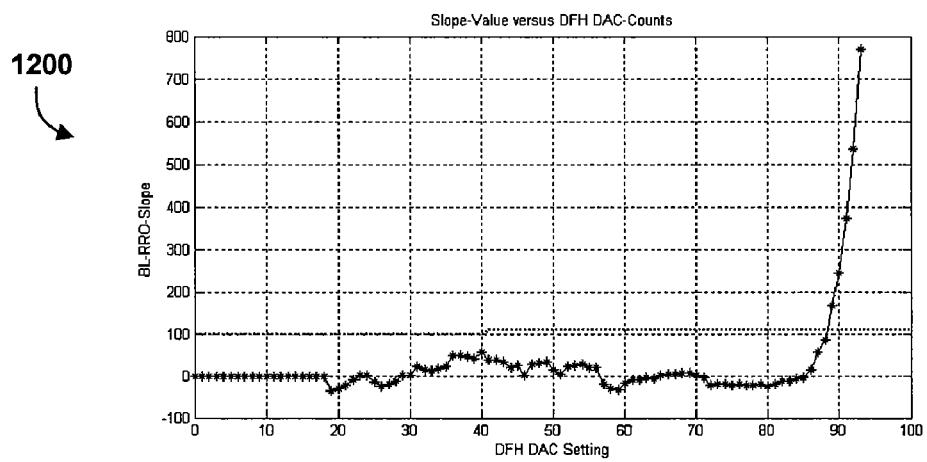
FIG. 12 sets forth a graph that illustrates the output of the slope method, according to an embodiment of the invention.

FIG. 12 sets forth a graph 1200 that illustrates the output of slope method 1100 using the data from graph 1002 in FIG. 10B, which is a graph of band-limited PES variance measured against DFH power as determined by band-limited RRO method 700. Considering that graph 1002 was generated from a "noisy" drive, as illustrated by the PES variance illustrated in FIG. 8B, graph 1200 indicates that slope method 1100 also works well in determining touchdown for a less than ideal drive.

Baseline RRO removal method 400, band-limited RRO method 700, and slope method 1100 may be performed in a conventional test environment, i.e., in a manufacturing setting. However, because no additional measuring equipment is required for disk drive to perform the above methods, a disk drive may also perform such methods whenever it may be deemed necessary. For example, a disk drive may perform baseline RRO removal method 400, band-limited RRO method 700, and/or slope method 1100 on one or more tracks upon each start-up of the drive, or periodically throughout the life of the drive. Alternatively, a drive may perform said methods on one or more tracks under specific circumstances, e.g., whenever the drive reaches a certain temperature, or as a part of an error-recovery algorithm.

The use of PES variance, as described herein, provides a number of advantages over methods known in the art for determining touchdown. First, no external equipment is required for disk drive to perform touchdown determination. Second, as illustrated by FIGS. 6A, 6B, 9A, 9B, and 12, a touchdown determination algorithm based on the methods disclosed herein provides a reliable method for detecting touchdown, even for drives experiencing significant baseline RRO and/or high-frequency NRRO. Third, minimal head/disk contact is required.

While the foregoing is directed to embodiments of the present invention, other and further embodiments of the invention may be devised without departing from the basic scope thereof, and the scope thereof is determined by the claims that follow.

What is claimed is:

1. A method for detecting touchdown between a magnetic head and a recording medium, comprising:
    driving the magnetic head to multiple positions that are successively closer to the recording medium until touchdown is detected;
    determining a position error signal for each of the multiple positions;
    converting each of the position error signals from a time domain into a frequency domain;
    computing a combined variance value from variances in the position error signals with respect to a baseline position error signal at each of a discrete number of frequencies that are within one or more selected frequency bands in the frequency domain; and
    detecting touchdown when the difference between the average combined variance value for N1 positions of the magnetic head and a baseline average exceeds a threshold value, where N1 is two or more,
    wherein the N1 positions of the magnetic head include one of the multiple positions that is closest to the recording medium and the remaining N1-1 positions are successively the next closest to the recording medium, and
    wherein the baseline average is an average of the combined variance value for N2 positions of the magnetic head that are different from the N1 positions, and the N2 positions are all further away from the recording medium than the N1 positions.

2. The method according to claim 1, further comprising:
    raising the threshold value from time to time as the magnetic head is positioned closer to the recording medium.

3. A method for detecting touchdown between a magnetic head and a recording medium, comprising:
    driving the magnetic head to multiple positions that are successively closer to the recording medium until touchdown is detected;
    determining a position error signal for each of the multiple positions;
    converting each of the position error signals from a time domain into a frequency domain;
    computing a combined variance value from variances in the position error signals with respect to a baseline position error signal at each of a discrete number of frequencies that are within one or more selected frequency bands in the frequency domain; and
    detecting touchdown when the difference between the average combined variance value for N1 positions of the magnetic head and a baseline average exceeds a threshold value, where N1 is two or more,
    wherein the determined position error signal at each of the positions is equal to a measured position error signal minus a synchronous portion of a baseline position error signal.

* * * * *